US009845081B2

(12) United States Patent
Belanger et al.

(10) Patent No.: US 9,845,081 B2
(45) Date of Patent: *Dec. 19, 2017

(54) LIGHTED VEHICLE WASH COMPONENT

(71) Applicant: WashMe Properties, LLC, Northville, MI (US)

(72) Inventors: Michael J. Belanger, Northville, MI (US); Barry S. Turner, Novi, MI (US); Curtis S. Prater, Warren, MI (US); Michael S. Sayyae, Westland, MI (US)

(73) Assignee: WashMe Properties, LLC, Northville, MI (US)

( * ) Notice: Subject to any disclaimer, the term of this patent is extended or adjusted under 35 U.S.C. 154(b) by 374 days.

This patent is subject to a terminal disclaimer.

(21) Appl. No.: 14/474,817

(22) Filed: Sep. 2, 2014

(65) Prior Publication Data

US 2014/0366290 A1    Dec. 18, 2014

Related U.S. Application Data

(63) Continuation-in-part of application No. 14/456,636, filed on Aug. 11, 2014, now Pat. No. 9,499,135,
(Continued)

(51) Int. Cl.
*A46B 7/10* (2006.01)
*A46B 13/00* (2006.01)
(Continued)

(52) U.S. Cl.
CPC .............. *B60S 3/06* (2013.01); *A46B 13/001* (2013.01); *A46B 15/0002* (2013.01);
(Continued)

(58) Field of Classification Search
CPC .. B60S 3/06; B60S 3/063; B60S 3/066; A46B 3/08; A46B 3/10; A46B 3/14;
(Continued)

(56) References Cited

U.S. PATENT DOCUMENTS 5,134,742 A    8/1992  Ennis
5,784,748 A    7/1998  Belanger et al.
(Continued)

FOREIGN PATENT DOCUMENTS

JP    410244911 A    9/1998
JP    2001018767 A    1/2001
(Continued)

OTHER PUBLICATIONS

Partial Machine Translation of JP 2001-18767, Jan. 23, 2001, 10 pages.

*Primary Examiner* — Mark Spisich
(74) *Attorney, Agent, or Firm* — John S. Artz; Dickinson Wright PLLC

(57) ABSTRACT

A vehicle wash component includes a rotatable hub portion having an outer surface and an axis of rotation. The component includes a plurality of grooves formed in the outer surface of the rotatable hub with the plurality of grooves being spaced about the perimeter of the outer surface of the hub portion. Each of the plurality of grooves includes one or more media elements disposed therein. The outer surface of the rotatable hub includes a plurality of channels formed therein. The plurality of channels are spaced apart from the plurality of grooves such that each of the plurality of channels is visible when the plurality of media elements are disposed in the plurality of grooves. An illumination source disposed in each of the plurality of channels such that the illumination source in each of the plurality of channels can be seen between the plurality of media elements as the rotatable hub portion operates.

34 Claims, 10 Drawing Sheets

Related U.S. Application Data which is a continuation-in-part of application No. 13/668,093, filed on Nov. 2, 2012, now Pat. No. 8,819,887.

(60) Provisional application No. 61/554,559, filed on Nov. 2, 2011, provisional application No. 61/556,893, filed on Nov. 8, 2011, provisional application No. 61/642,831, filed on May 4, 2012.

(51) Int. Cl.
| | | |
|---|---|---|
| *B60S 3/06* | (2006.01) | |
| *A46B 15/00* | (2006.01) | |
| *F21S 4/20* | (2016.01) | |
| *F21Y 103/10* | (2016.01) | |
| *F21Y 115/10* | (2016.01) | |

(52) U.S. Cl.
CPC ................ *B60S 3/063* (2013.01); *F21S 4/20* (2016.01); *A46B 2200/3046* (2013.01); *F21Y 2103/10* (2016.08); *F21Y 2115/10* (2016.08)

(58) Field of Classification Search
CPC ......... A46B 7/10; A46B 13/00; A46B 13/001; A46B 13/003; A46B 13/005; A46B 13/006; A46B 13/02; A46B 15/00; A46B 15/0055; A46B 2200/3046
USPC .. 15/4, 53.1–53.4, 97.3, 179, 181–183, 230, 15/230.14, 230.16, 230.18, 230.19
See application file for complete search history.

(56) References Cited

U.S. PATENT DOCUMENTS

| | | |
|---|---|---|
| 6,532,615 B2 | 3/2003 | Clark |
| 7,743,454 B2 | 6/2010 | Favagrossa |
| 8,495,786 B2 | 7/2013 | Naftal |
| 2004/0200024 A1 | 10/2004 | Yamin |
| 2006/0207047 A1 | 9/2006 | Weyandt |
| 2008/0078048 A1 | 4/2008 | Belanger |
| 2009/0250993 A1 | 10/2009 | Vivyan et al. |
| 2011/0138558 A1 | 6/2011 | Favaqgrossa |

FOREIGN PATENT DOCUMENTS

| | | |
|---|---|---|
| JP | 2005170221 A | 6/2005 |
| JP | 2007260379 A | 10/2007 |
| JP | 2008061723 A | 3/2008 |
| JP | 2009055960 A | 3/2009 |

LIGHTED VEHICLE WASH COMPONENT

CROSS REFERENCE TO RELATED APPLICATION

The present Continuation-in-Part application claims priority to U.S. Continuation-in-Part patent application Ser. No. 14/456,636, entitled "Lighted Vehicle Wash Component", which was filed on Aug. 14, 2014, now U.S. Pat. No. 9,499,135, U.S. Utility patent application Ser. No. 13/668,093, entitled "Illuminated Hub for a Vehicle Wash Component", which was filed on Nov. 2, 2012, now U.S. Pat. No. 8,819,887, which claims priority to U.S. Provisional Patent Application Ser. No. 61/554,559, entitled "Car Wash Implement and Splayable Foam Plastic Element for Use in Constructing Same", which was filed on Nov. 2, 2011; U.S. Provisional Patent Application Ser. No. 61/556,893, entitled "Injection Molded Foamed Polymeric Car Wash Media", which was filed on Nov. 8, 2011; and U.S. Provisional Patent Application Ser. No. 61/642,831, entitled "Top Brush", which was filed on May 4, 2012, the disclosures of which are all hereby incorporated by reference as though set forth fully herein.

TECHNICAL FIELD

The present disclosure relates generally to a vehicle wash component for use in cleaning a vehicle exterior in a vehicle wash facility. More specifically, the present disclosure relates to a lighted vehicle wash component for cleaning a vehicle exterior in a vehicle wash facility that yields enhanced aesthetics.

BACKGROUND OF THE DISCLOSURE

Vehicle wash facilities are generally known to have dark and dirty environments, which can make them unattractive to customers and potential customers. This environment results, in part, from the fact that current rotary brush components typically employ a cylindrical central hub design that is densely populated with a plurality of washing elements such that the hub is not visible either at rest or during operation. This densely populated hub also serves to block a great deal of light to a vehicle occupant as the wash component approaches the vehicle during the vehicle wash process due to the large volume of the washing elements. This can result in a significant darkening of the vehicle interior and an unpleasant wash experience for the vehicle occupant. Combine this darkness with windshields and side windows that are often covered with soapy water and visibility for vehicle occupants within current vehicle wash facilities is very low.

Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or these extra services they offer, the lighting is very selective and does little to improve the overall environment within the vehicle wash facility. Moreover, because of the configuration of existing rotary brush components, which block a vehicle occupant from seeing these lights during the vehicle wash process as well as the low visibility in existing washes, these lights generally cannot be seen by vehicle occupants during the vehicle wash process. As such, these lights therefore do not assist in making the vehicle wash process less intimidating.

Another disadvantage of current vehicle wash configurations is that they share a largely similar, utilitarian appearance that makes it correspondingly difficult for wash owners to provide a distinctive or memorable service offering to their customers. Lighted arches and signs do little to overcome this problem as any attempted branding created thereby is obstructed to vehicle occupants during the wash process, as discussed above.

It would thus be desirable to provide a vehicle wash component that addresses these issues.

SUMMARY OF THE DISCLOSURE

It is therefore an aspect of the present disclosure to provide a lighted vehicle wash component that yields improved aesthetics within the vehicle wash facility.

It is another aspect of the present disclosure to provide a lighted vehicle wash component that enhances a customer's experience during the wash process.

It is a further aspect of the present disclosure to provide a lighted vehicle wash component that can help create brand recognition for a vehicle wash facility.

It is a still another aspect of the present disclosure to provide a lighted vehicle wash component that can brighten the environment within a vehicle wash facility.

It is yet another aspect of the present disclosure to provide a lighted vehicle wash component that yields enhanced brightness and aesthetics for a vehicle wash facility when the wash component is at rest.

In accordance with the above and the other aspects of the present disclosure, a lighted vehicle wash component is provided. The lighted vehicle wash component includes at least one rotatable hub portion having an outer surface and an axis of rotation. The outer surface of the rotatable hub includes a plurality of grooves formed therein, the plurality of grooves being spaced about the perimeter of the hub outer surface. A plurality of wash media elements are secured in each of the plurality of grooves. The rotatable hub also includes a plurality of channels formed in the outer surface thereof. The plurality of channels are spaced about the perimeter of the outer surface of the hub portion in clearance zones between adjacent ones of the plurality of grooves. An illumination source is disposed in each of the plurality of channels such that the illumination source in each of the plurality of channels is also disposed in the clearance zones and is visible between the plurality of media elements as the rotatable hub portion operates and while it is at rest.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Figure 1:
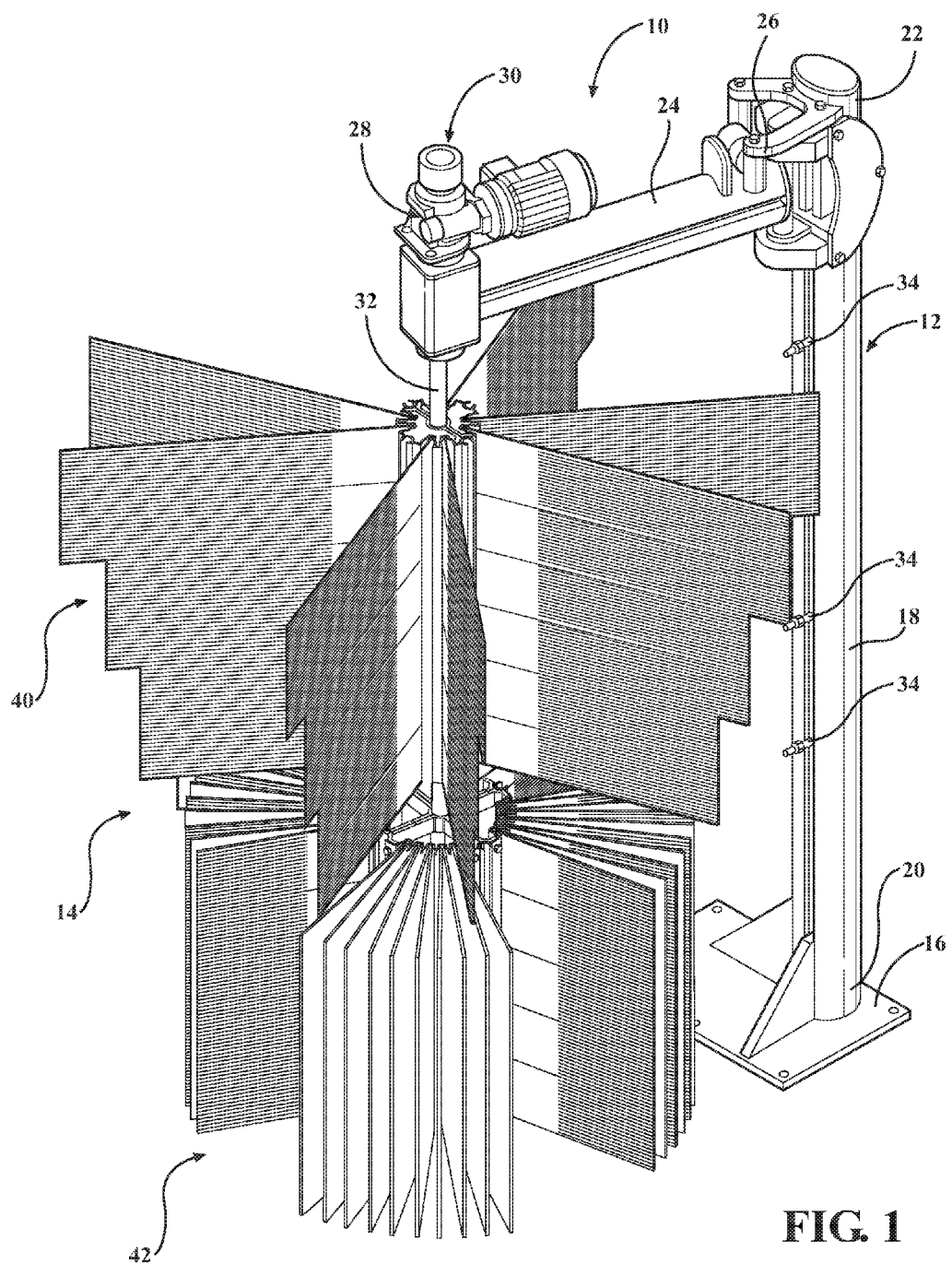
FIG. 1 is perspective view of a lighted vehicle wash component in accordance with an aspect of the disclosure.

According to an aspect, the present disclosure relates to a treatment component for a vehicle wash system. The vehicle wash system may be configured as a tunnel car wash where a vehicle is conveyed through the wash process by a conveyor or the like as is known in the art. Alternatively, the vehicle wash system may be configured as a roll-over type where the vehicle remains stationary and the various treatment components may be translated and/or moved with respect to the vehicle to perform the vehicle wash process. Other suitable wash processes and systems may also be employed as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed treatment component could also be employed in connection with a variety of other applications outside of a vehicle wash system, such as a manual or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. An exemplary bubble device that may be employed with the disclosed system is contained in Applicant's co-pending U.S. patent application Ser. No. 13/864,813, entitled "A Vehicle Wash Component for Emitting Bubbles", filed Apr. 17, 2013, the disclosure of which is hereby incorporated by reference. Other suitable devices for generating bubbles or foam may also be employed. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. A further component that may be employed can include a drying apparatus for removing water from the vehicle exterior. According to a further aspect, the system can include a wheel polishing device for treating vehicle wheels.

It will be appreciated that more, less or different wash components may be employed. Additionally, multiples of the same components may be employed as part of the system, as desired. Further, the components may take on a variety of different configurations. Moreover, the order, placement and sequence of the components within the system may also vary. According to an aspect, the components may be designed to engage and/or treat a vehicle disposed within the vehicle treatment area of the vehicle wash facility.

Figure 2:
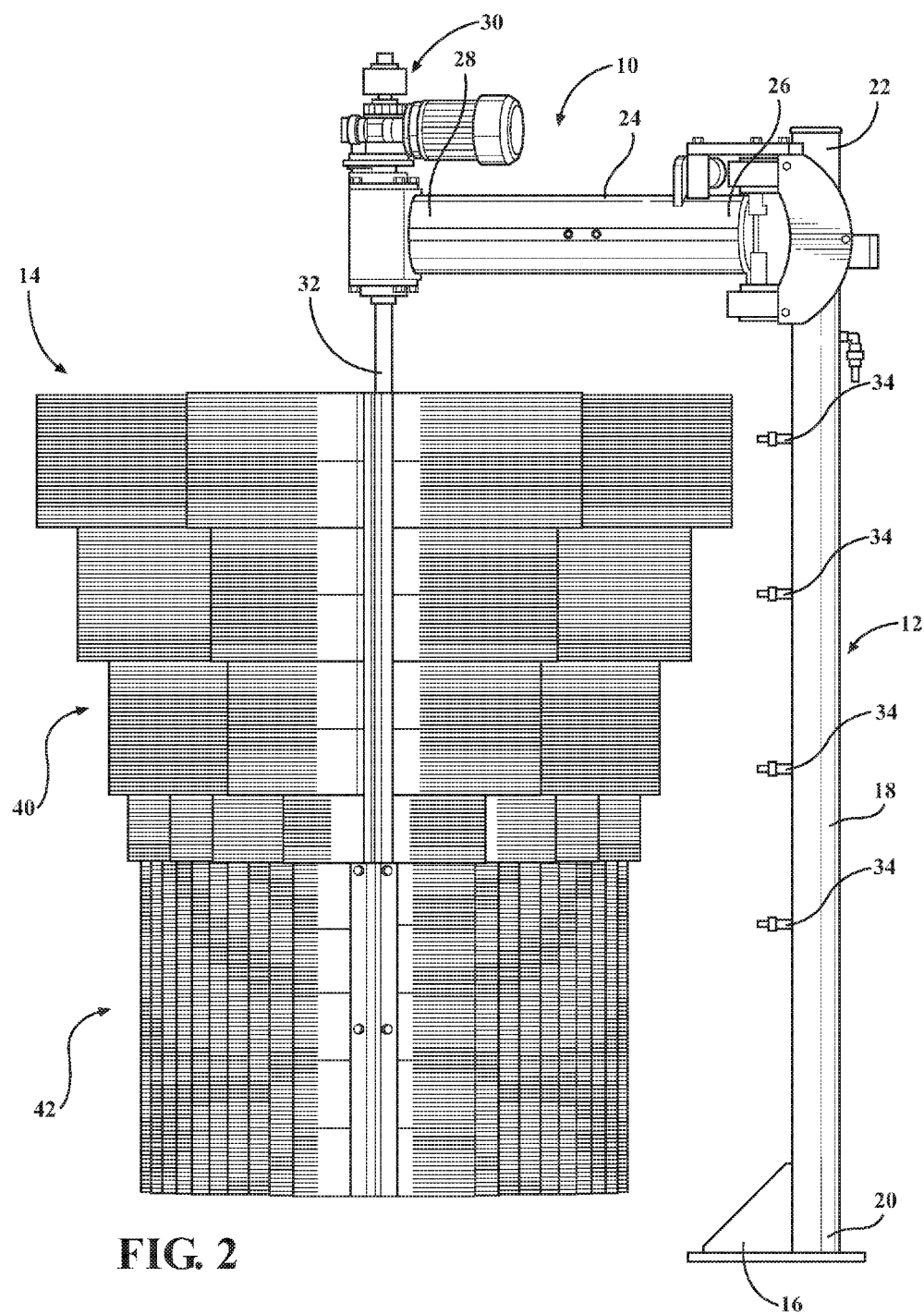
FIG. 2 is a side view of the lighted vehicle wash component of FIG. 1.

According to an aspect, the present disclosure relates to a lighted vehicle wash component 10 for treating an exterior surface of a vehicle, such as a painted surface. However, the disclosed component 10 can also treat other vehicle surfaces. With reference to FIGS. 1 and 2, the vehicle wash component 10 may be a side brush configured to contact side surfaces of a vehicle. It will be appreciated that other types of brushes, such as top brushes, may also be employed. According to an aspect, the vehicle wash component 10 may broadly consist of a frame portion 12 and a brush portion 14 supported by the frame portion 12. The component 10 can be particularly suited for use in vehicle wash applications so that while it is being rotated by a suitable power source, such as a motor, it can be brought into contact with the exterior surface of a vehicle to perform a scrubbing or cleaning function to remove dirt or debris therefrom. It will be appreciated that the disclosed side brush can also perform other functions besides cleaning.

According to an aspect, the frame portion 12 can generally include a baseplate portion 16 and a vertical support 18. According to an aspect, the baseplate portion 16 may be a generally flat structure that may be mounted to a floor of the vehicle wash facility. The vertical support 18 may have a lower end 20 that connects to the baseplate portion 16 and an upper end 22 disposed away from the baseplate portion 16. A swingarm portion 24 having an inner end 26 and an outer end 28 may be connected to the upper end 22 of the vertical support 18 at its inner end 26. According to an aspect, the swingarm portion 24 may be pivotally connected to the vertical support 18 to allow for adjustments to accommodate varying vehicle lengths. It will be appreciated that the frame 12 may consist of more or less components and may take on a variety of different configurations. In accordance with another aspect, the components of the frame 12 may be constructed of a metal material and may be powder-coated to resist against corrosion. Alternatively, the components of the frame 12 may be constructed of a plastic or other suitable non-metal material. All or portions of the frame 12 could alternatively be formed as a single integral structure. It will be appreciated that the frame 12 could be mounted in a variety of other suitable ways, including to the walls or the ceiling of the wash facility. It will also be appreciated that the component 10 may be disposed adjacent a vehicle treatment area of a vehicle wash facility.

According to an aspect, the brush portion 14 may be secured to the outer end 28 of the swingarm portion 24. The brush portion 14 may be configured to extend downwardly with respect to the swingarm portion 24 and can rotate about an axis that is oriented generally perpendicular to the swingarm portion 24. According to another aspect, the brush portion 14 may pivot with respect to the outer end 28 such as in response to contact with a vehicle exterior. This can allow the brush portion 14 to provide increased cleaning capabilities, but also minimizes any damage that could result from the application of greater than intended forces thereto. According to a further aspect, the brush portion 14 may be rotated about its axis of rotation by a drive mechanism 30, which includes a drive shaft 32. The drive mechanism 30 may configured as an electric drive motor, however, a variety of other suitable drive motors or drive mechanism may be employed to effectuate rotation of the brush portion 14 at predetermined speeds. The drive mechanism 30 can also be operated by a control system, which can also operate other components in the vehicle wash system. A suitable control system can include a computer with a processor and suitable memory for storing encoded logic and executing same based on certain programmed criteria. It will be appreciated that the control system can be utilized to operate all of the components in a wash system.

According to an aspect, the brush portion 14 may generally include an upper brush assembly 40 and a lower brush assembly 42 that are in communication with the drive shaft 32. The upper brush assembly 40 and the lower brush assembly 42 may rotate in unison in the same direction. Alternatively, they may rotate at different speeds. According to a further aspect, they could rotate in opposite directions at the same time. It will be appreciated that the component 10 could include more or less brush assemblies as desired. It will also be appreciated that the brush portion 14 could take on a variety of different configurations. The frame 12 can also include a plurality of spray orifices 34 for emitting a fluid such as water or soap onto the brush assemblies 40, 42. It will be appreciated that the spray orifices may be employed to emit other fluids such as foam or chemicals.

Figure 3:
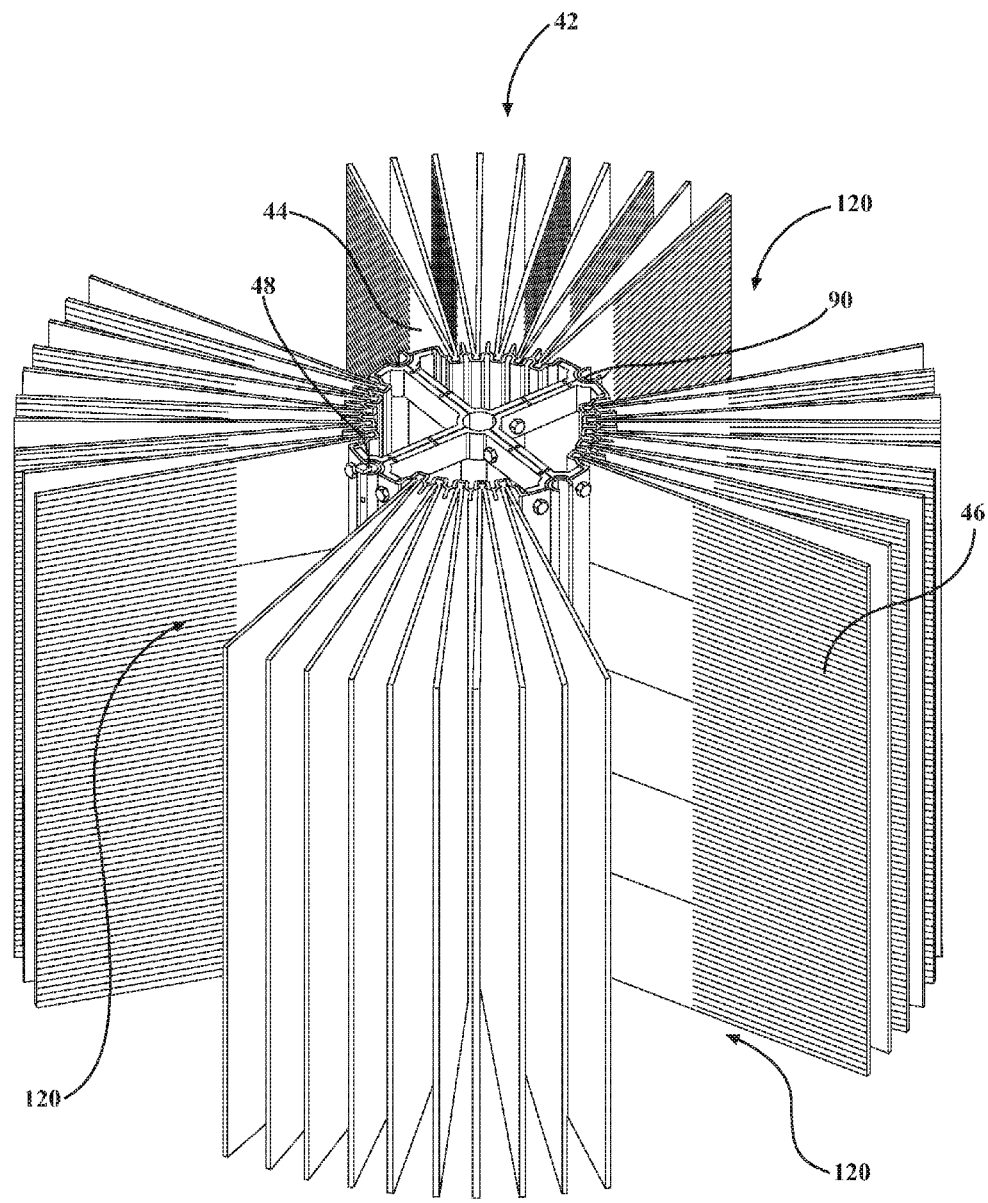
FIG. 3 is a perspective view of a section of a brush portion of a lighted vehicle wash component in accordance with an aspect of the disclosure.
Figure 4:
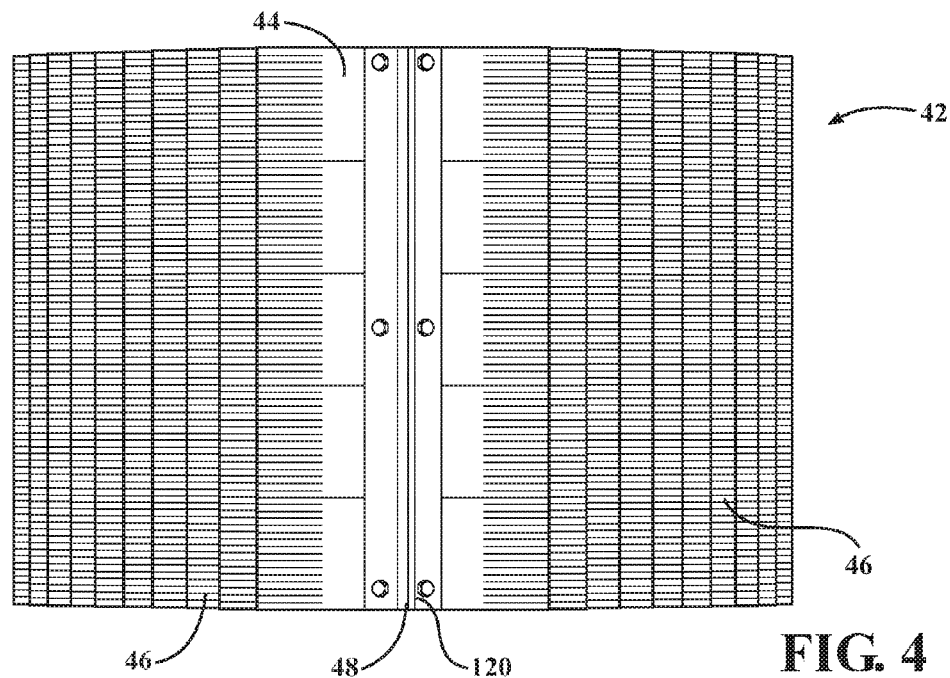
FIG. 4 is a side view of the section of the brush portion of FIG. 3.
Figure 5:
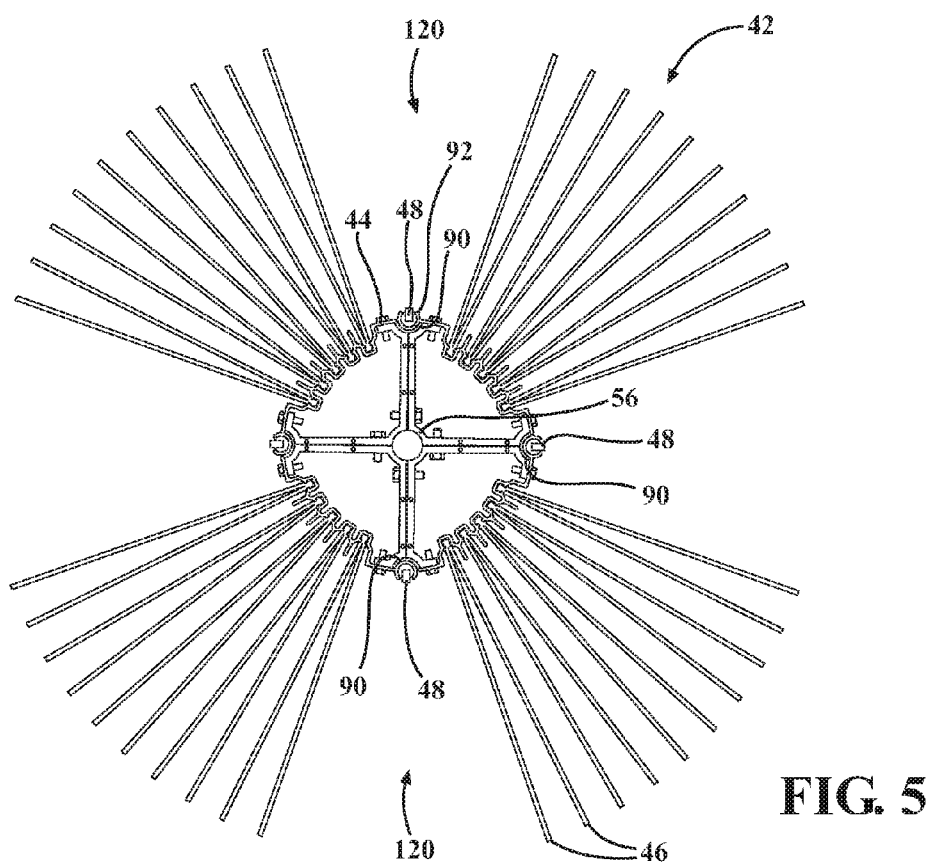
FIG. 5 is a top view of the section of the brush portion of FIG. 3.
Figure 8:
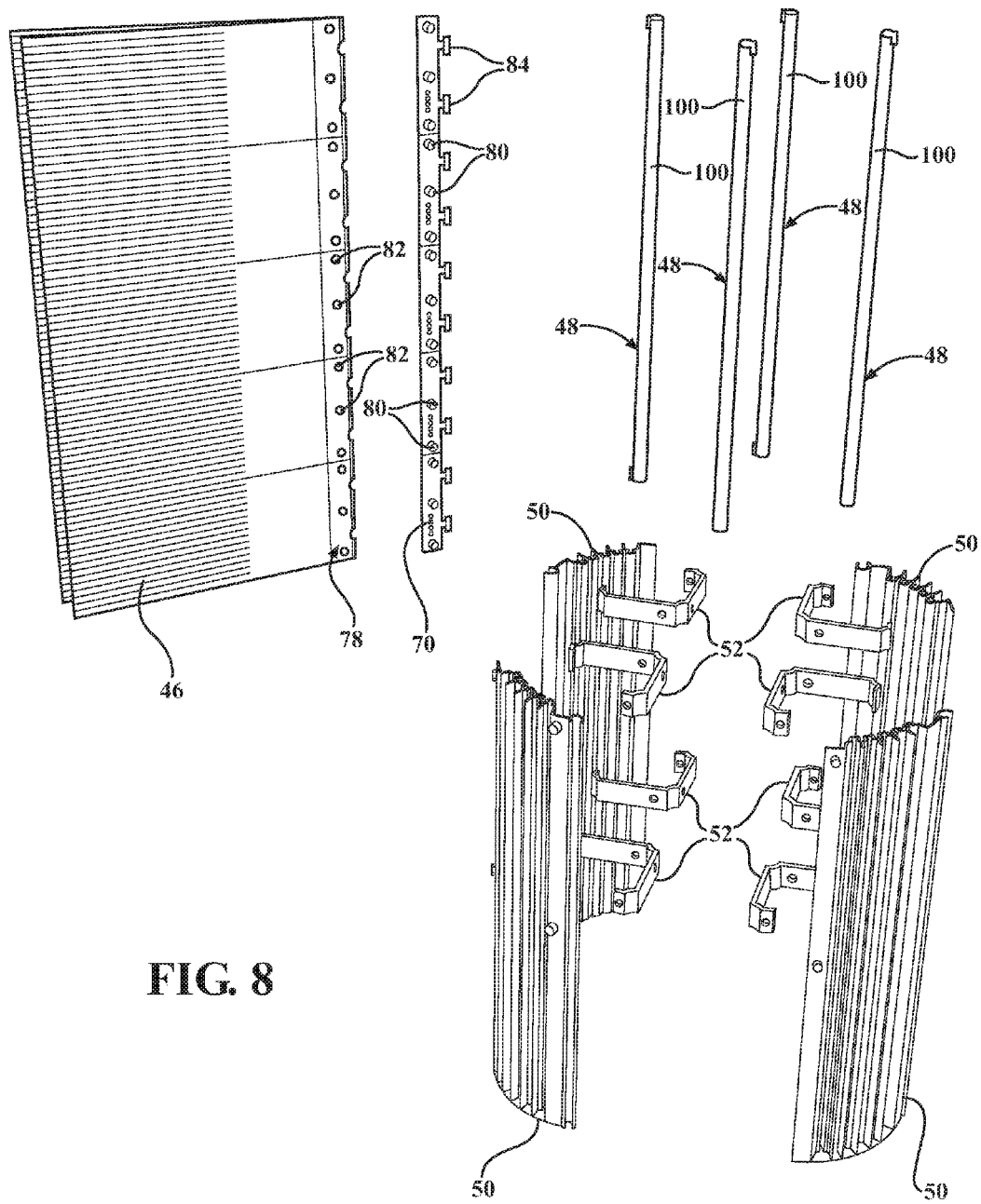
FIG. 8 is an schematic exploded view of a partial brush portion for a lighted vehicle wash component in accordance with an aspect of the present disclosure.
Figure 9:
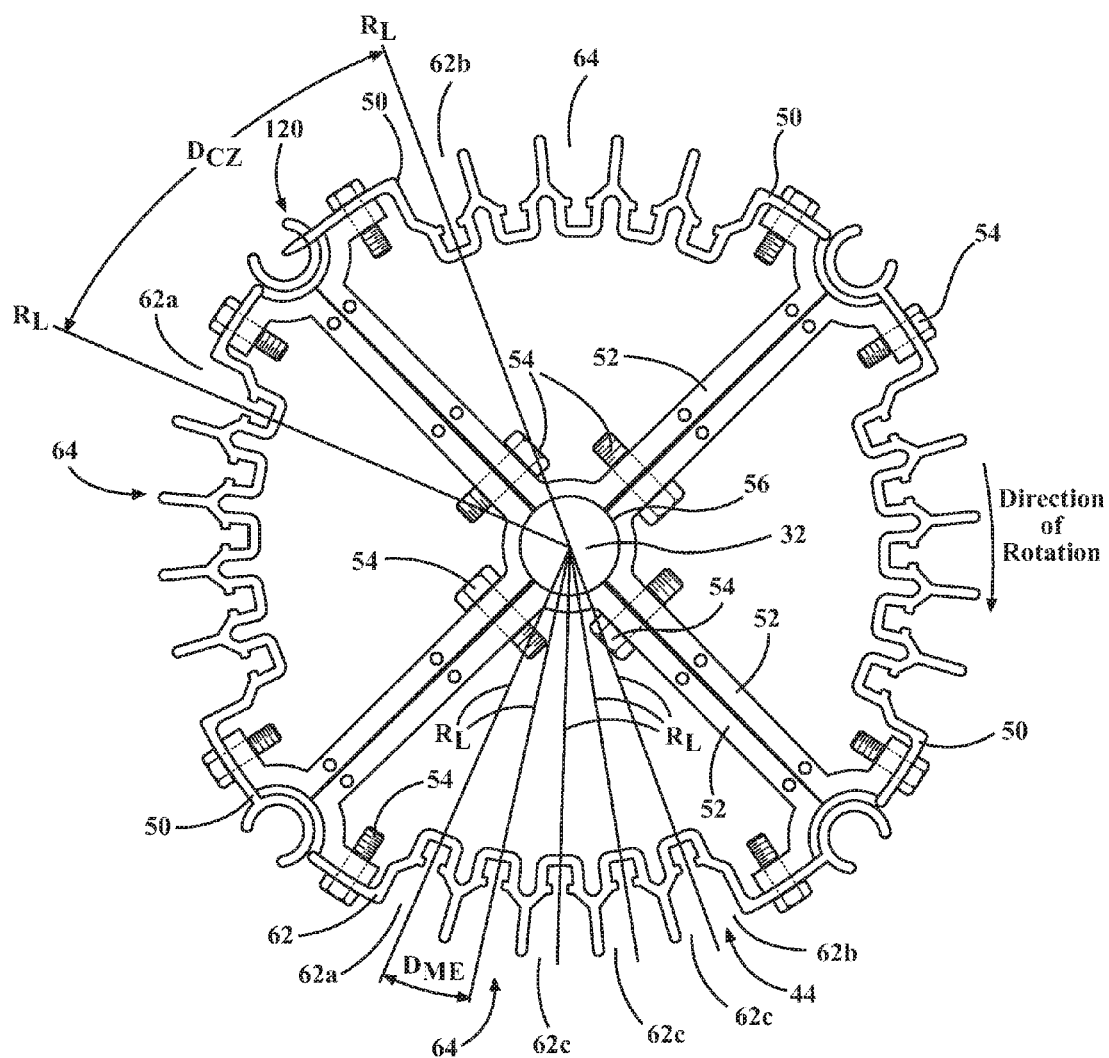
FIG. 9 is a top view of a hub portion for a vehicle wash component in accordance with an aspect of the present disclosure.

With reference to FIGS. 3 through 5, the lower brush assembly 42 can include a hub portion 44, a plurality of wash media elements 46 in communication with the hub portion 44, and a plurality of illumination elements 48 in communication with the hub portion 44. According to an aspect and as shown in FIGS. 8 and 9, the hub portion 44 may be constructed of four skin portions 50 that can be assembled together by a plurality of spider connections 52 and a plurality of conventional fasteners 54. Once assembled, a through hole 56 may be created at the intersection of the plurality of spider connections 52 which may receive the drive shaft 32 therethrough, for effectuating rotation of the hub portion 44 and thus the lower brush assembly 42.

According to an aspect, the hub portion 44 has an exterior surface 60 with a plurality of grooves 62 which may open onto the exterior surface 60. The plurality of grooves 62 may be arranged in groupings 64 around the periphery of the exterior surface 60 of the hub portion 44. As shown, each grouping 64 may include 5 individual grooves. Each grouping 64 can include a leading wash media groove 62a, a trailing wash media groove 62b, and a plurality of intermediate wash media grooves 62c disposed between the leading wash media groove 62a and the trailing wash media groove 62b. According to a further aspect, the leading wash media groove 62a and the trailing wash media groove 62b may be defined by a direction of rotation of the hub portion where the wash media element 46 disposed in a leading wash media groove 62a will contact a vehicle exterior in advance of a wash media element 46 disposed in a trailing wash media groove 62b.

Figure 11:
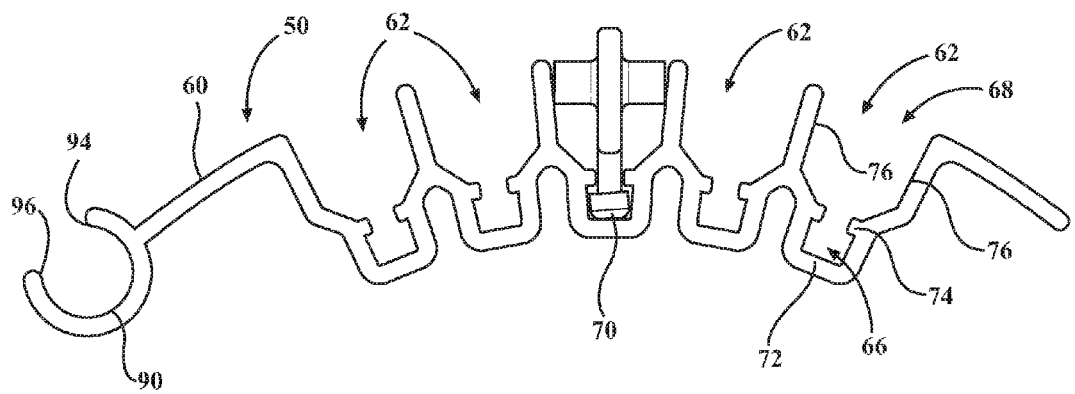
FIG. 11 is an enlarged view of a skin section of the hub portion of FIG. 9.

Each of the individual grooves 62 may be configured to receive one or more wash media elements 46 therein. It will be appreciated that any number of grooves 62 may be employed in each grouping 64 and that they may be formed in a variety of different arrangements. According to an aspect and as best shown in FIGS. 9 and 11, each of the grooves 62 can include an inner portion 66 and an outer portion 68. As shown, the inner portion 66 may be generally configured as a closed channel for receiving a retaining clip portion 70 of a wash media element 46. The closed channel may generally include a base portion 72 and a narrow slot 74 that may be configured narrower than a pin portion 84 of the retaining clip portion 70 to keep it retained therein, but allows the remainder of the clip portion to pass therethrough. According to a further aspect, the outer portion 68 may consist of a pair of side walls 76 that are spaced apart and generally flared in order to prevent rotation of the retaining clip 70. Each of the grooves 62 defines a radial reference line $R_L$ through its respective center. It will be appreciated that the grooves may take on a variety of different configurations.

According to a further aspect, a wash media element 46 may be removeably disposed in each of the grooves 62. While the wash media elements 46 may be removed as desired such as for replacement purposes, they may be securely retained in each of the grooves such that they can remain in place as the hub portion 44 rotates. As shown and according to a further aspect, the media elements 46 are spaced apart a distance (Dme) as defined by the distance between adjacent radial reference lines $R_L$. According to an aspect, the wash media elements 46 may be constructed of a self-supporting material such as foam so that they substantially retain their shape at all times and do not droop or sag while the vehicle wash component 10 is at rest. According to another aspect, the wash media elements 46 may be constructed of a soft cloth material. It will be appreciated that the media elements may be formed of a variety of different materials and may have other suitable configurations.

According to an aspect, the retaining clip portion 70 may be secured to an inner end 78 of the wash media elements 46. According to an aspect, the retaining clip portion 70 may include a plurality of mounting posts 80 that are configured to engage corresponding mounting holes 82 formed in the inner end 78 of the wash media elements 46 to assist in securing the retaining clip portion 70 to the wash media element 46. According to a further aspect, the pin portion 84 may engage and slide within the closed channel portion 66 to retain the media element 46 to the hub portion 44. According to an aspect, the pin portion 84 may be generally rectangular in shape. It will be appreciated that the pin portion 84 can have a variety of different shapes and configurations. When secured, the mounting posts 80 can engage the sidewalls 76 to prevent rotation of the media elements 46 and provide support therefor.

According to another aspect, the hub portion 44 can include a plurality of illumination element receptacles 90 formed in the exterior surface 60, which may be configured to receive at least one illumination element 48 therein. According to another aspect, there may be four illumination element receptacles 90 and they may be interposed between adjacent ones of groupings 64 of plurality of grooves 62. The illumination element receptacles 90 may have a generally circular shape with an open front 92 defined by a pair of side portions 94, 96 for receiving and retaining an illumination element 48 therein. It will be appreciated that more or less illumination element receptacles 90 may be employed and that they be disposed in different locations on the hub exterior surface 60. Additionally, the illumination element receptacles 90 may have a variety of different shapes and configurations. It will be appreciated that the illumination element receptacles can have a variety of different configurations.

Figure 12:
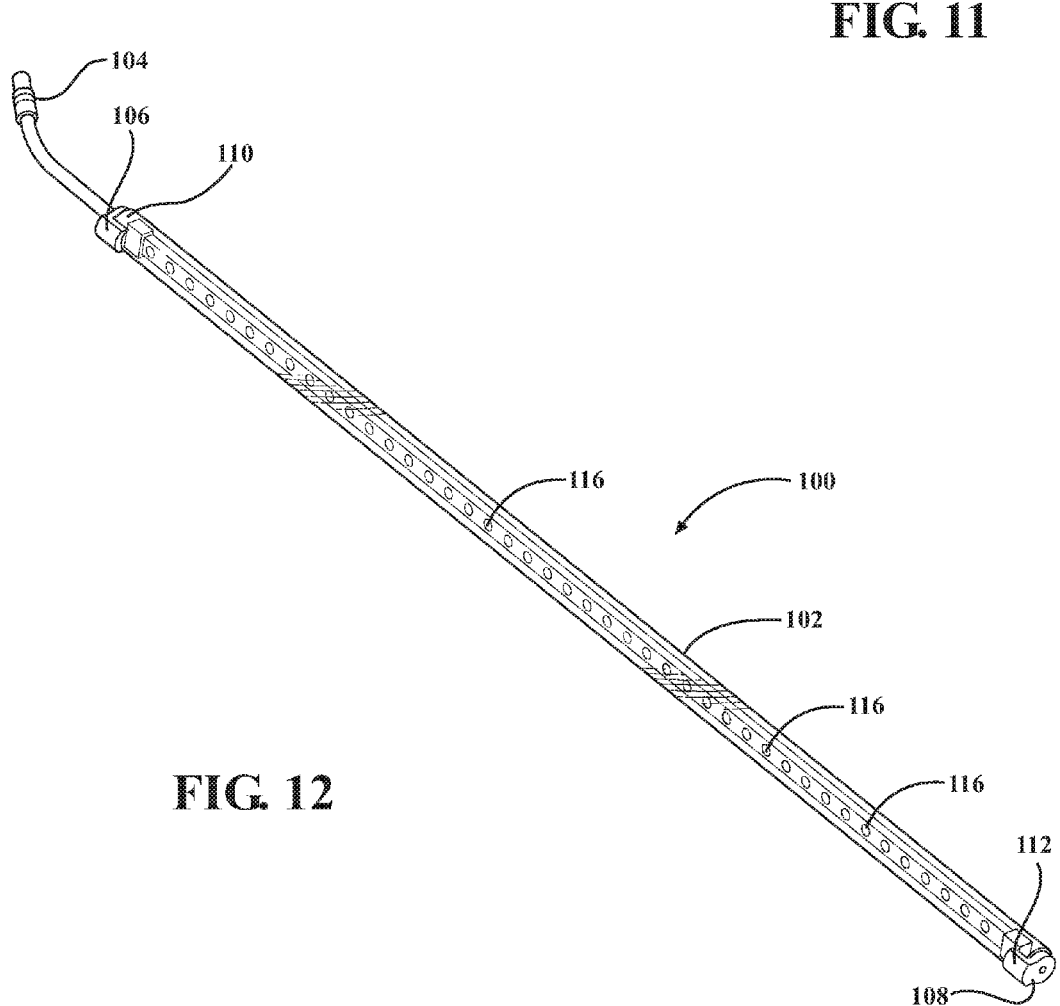
FIG. 12 is a perspective view of a lighted element for a vehicle wash component in accordance with an aspect of the present disclosure.

According to an aspect and with reference to FIG. 12, each of the illumination elements 48 could be configured as an elongated LED light strip 100. According to another aspect, the illumination element 48 could be configured to have a length that matches or substantially matches the length of the hub portion 44. Alternatively, the illumination element 48 could be configured with a length that is considerably shorter or longer than the length of the hub portion 44. According to a further aspect, the LED light strip 100 could be encased in a transparent outer tubing 102 that provides protection for the LED light strip 100, including from water and chemicals that can exist in the vehicle wash process. The LED light strip 100 can also include an upper end cap 106 and a lower end cap 108 that are each include a front face portion 110 and 112 respectively, that are each configured to reside in the open front 92 of each the illumination receptacles 90. The front face portions 110, 112 can be sized such that they will generally abut the pair of side portions 94, 96 in order to prevent rotation of the LED light strip 100 within the illumination receptacle and thus keep it aligned such that the individual light sources 116 are properly oriented for visibility. Each of the LED light strips 100 can also include an electrical connector 104 that can allow for the provision of power thereto to effectuate illumination thereof. It will be appreciated that a variety of different types of illumination sources may be employed. It will also be appreciated that the illumination sources can have a variety of different sizes and configurations.

According to a still further aspect, the lower brush assembly 42 can include a clearance zone 120 that may be disposed between adjacent sections of wash media elements 46. The clearance zone 120 may be created by disposing the illumination receptacles 90 between adjacent ones of groove groupings 64 on the hub exterior surface 60 such that the illumination receptacles will not be obstructed by the wash media elements 46 when attached to the hub portion 44. According to an aspect, the clearance zone 120 can coincide with the location of illumination receptacles 90 such that the illumination elements 48 may be readily visible when the wash media elements 46 are attached to the hub portion 44. According to an aspect, the clearance zones 120 may be sized such that light from the illumination elements 48 may be seen as the component 10 is being operated as well as while it is at rest. As shown in FIG. 9, the clearance zones 120 may have distance (Dcz) defined as the distance between the trailing wash media groove 62b of the leading wash media groove grouping 64 and the leading wash media groove 62a of the trailing wash media groove grouping 64. According to an aspect, the clearance zone distance (Dcz) may be larger than the distance between the media elements (Dme). According to a still further aspect, the clearance zone distance (Dcz) may be substantially larger than the distance between the media elements (Dme). It will be appreciated that the size of the clearance zones can vary. According to an aspect, multiple clearance zones 120 may be uniformly spaced about the periphery of the hub portion 44 to provide a unique aesthetic affect for the component 10.

According to an aspect, the plurality of illumination elements 48 may be connected via its connectors 104 through slip rings to a DC power source so as to emit light from the lower brush assembly 42 during rotation of the device. In other words, lighted illumination elements 48 can rotate with the component 10 as it rotated. It will be appreciated that other types of suitable illumination elements 48 may also be utilized. It will also be appreciated that other suitable ways for attaching the illumination elements to the hub portion may be employed.

According to an aspect, each of the skin portions 50 may be constructed of a metal material, such as aluminum. However, the skin portions 50 may be formed from a variety of other suitable materials. According to another aspect, each of the skin portions 50 may be formed from an extrusion process. According to this aspect, each skin portion 50 may be extruded such that it is formed with at least one groove and at least one illumination element receptacle integrated with an exterior surface thereof. It will be appreciated that the skin portions 50 may be formed from a variety of other suitable forming processes.

Figure 6:
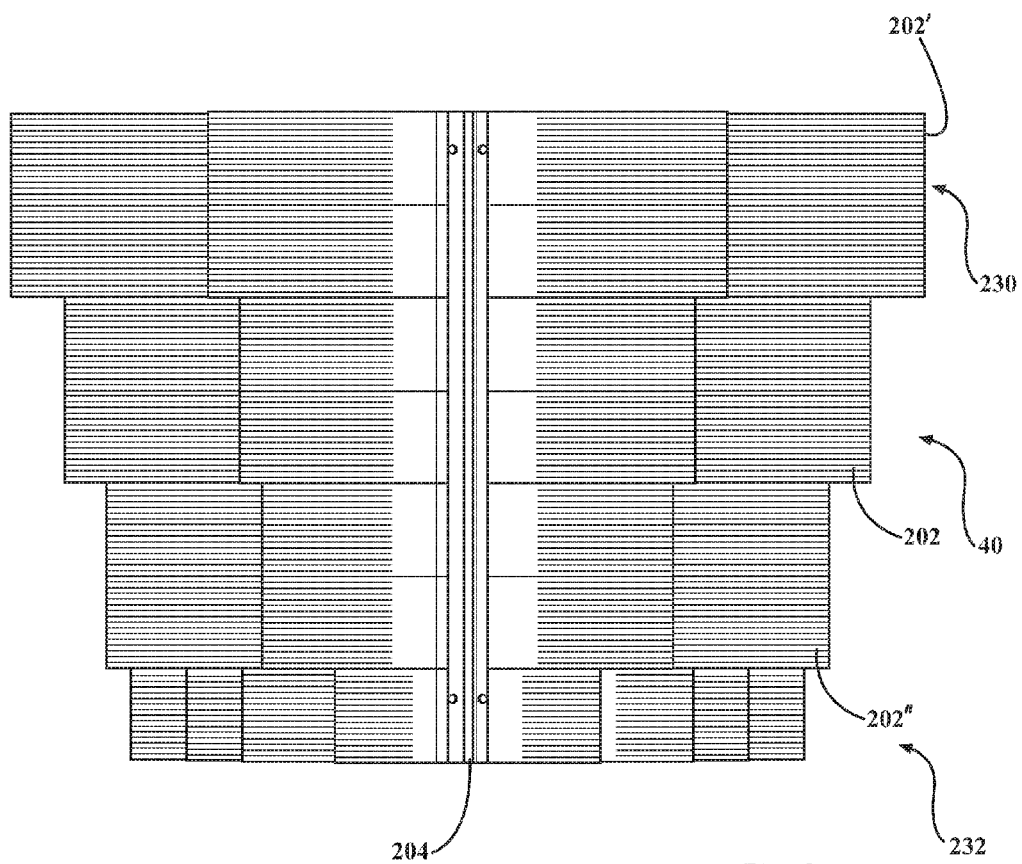
FIG. 6 is a side view of another section of a brush portion of a lighted vehicle wash component in accordance with an aspect of the present disclosure.
Figure 7:
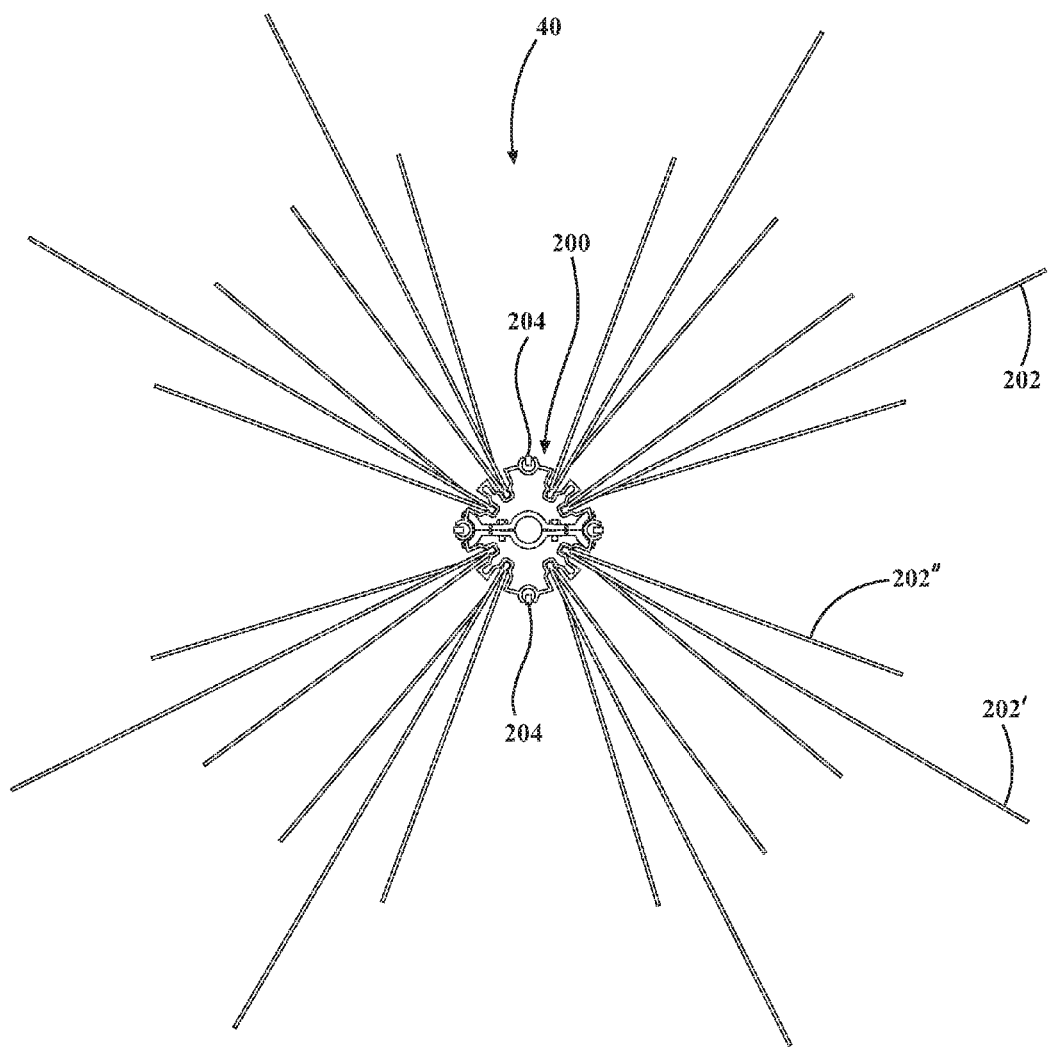
FIG. 7 is a top view of the section of the brush portion of FIG. 6.
Figure 10:
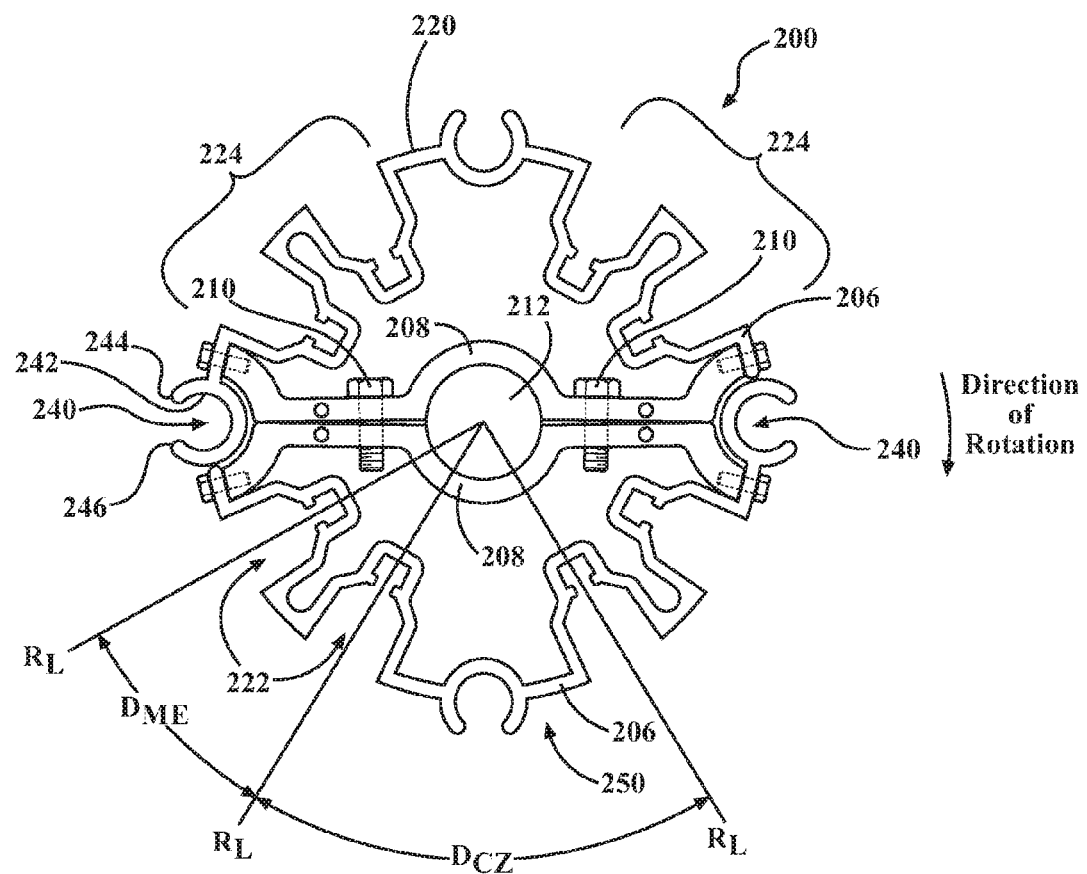
FIG. 10 is a top view of another hub portion for a vehicle wash component in accordance with another aspect of the present disclosure.

According to another aspect, FIGS. 6 through 7 illustrate the upper brush assembly 40 of the brush portion 14. Some of the components of the upper brush assembly 40 may be the same as on the lower brush assembly 42 and the structure and function of those components can be the same and need not be described fully again. According to a further aspect, the upper brush assembly 40 can include a hub portion 200, a plurality of wash media elements 202 in communication with the hub portion 200, and a plurality of illumination elements 204. According to an aspect and as shown in FIG. 10, the hub portion 200 may be constructed of two skin portions 206 that can be assembled together by a plurality of spider connections 208 and a plurality of conventional fasteners 210. Once assembled, a through hole 212 may be created at the intersection of the plurality of spider connections 208 which may receive the drive shaft 32 therethrough, for effectuating rotation of the hub portion 200 and thus the upper brush assembly 40. It will be appreciated that the hub portion 200 and the hub portion 44 may be driven simultaneously by the drive shaft 32. They may alternatively be driven independently. It will be appreciated that the upper brush assembly 40 can have a smaller diameter than the lower brush assembly 42. However, the hub portion 200 may vary in size to vary the diameter of the upper brush assembly 40. The hub portion 200 may be formed of the same material and by the same processes as the hub portion 44.

According to an aspect, the hub portion 200 may have an exterior surface 220 with a plurality of grooves 222 opening onto the exterior surface 200. The plurality of grooves 222 may be arranged in groupings 224 around the periphery of the exterior surface 220 of the hub portion 200. As shown, each grouping 224 may include 2 individual grooves. Each of the individual grooves 222 may be configured to receive one or more wash media elements 202 therein. It will be appreciated that any number of grooves 222 may be employed and that they may be formed in a variety of different arrangements. According to an aspect and as best shown in FIG. 10, each of the grooves 222 can have the same configuration as the grooves 222 formed on the hub portion 44. Again, it will be appreciated that the grooves 222 may take on a variety of different configurations. The grooves 222 also define a radial reference line $R_L$ through their center.

According to a further aspect, the wash media elements 202 may be removeably disposed in each of the grooves 222. While the wash media elements 202 may be removed as desired such as for replacement purposes, they may be securely retained in each of the grooves 222 such that they can remain in place as the hub portion 200 rotates. According to an aspect, the wash media elements 202 may be constructed of the same materials as the wash media elements 46 and may be connected to and retained within each of the grooves 222 in the same manner, which as discussed above, can obviously vary.

According to an aspect, as the hub 200 can have a smaller size than the hub 44, fewer wash media elements 202 may therefore be secured to the hub exterior surface 220. According to an aspect, this allows the upper brush assembly 40 to effectively clean upper portions of a vehicle that may have obstacles such as mirrors, antennas, and rear window wipers. According to another aspect, the media elements 202 may have different lengths such that upper media elements 202' may be longer than lower media elements 202". This allows the component 10 to vary the depth it can extend into the vehicle envelope. According to a further aspect, the length of the media elements 202 may progressively decrease from an upper part 230 of the hub portion 200 to a lower part 232. It will be appreciated that varying length media elements may be positioned in a variety of different places on the brush as desired. As also shown in FIGS. 1 and 2, the wash media elements 202 may all be longer then the media elements 46.

According to another aspect, the hub portion 200 can include a plurality of illumination element receptacles 240 formed in the exterior surface 220, which may be configured to receive at least one illumination element 204 therein. According to another aspect, there may be four illumination element receptacles 240 and they may be disposed between adjacent ones of groupings 224 of plurality of grooves 222 in a clearance zone 250 where no media elements 202 are present. The illumination element receptacles 240 may have a generally circular shape with an open front 242 defined by a pair of side portions 244, 246 for receiving and retaining an illumination element 204 therein. It will be appreciated that more or less illumination element receptacles 240 may be employed and that they may be disposed in different locations on the hub exterior surface 220. Additionally, the illumination element receptacles 240 may have a variety of different shapes and configurations. It will be appreciated that the illumination elements may be configured as LED light strips as described above, such as in connection with FIG. 12. However, their configuration may vary as also described above.

According to a still further aspect, the upper brush assembly 40 can include a plurality of clearance zones 250 that may be disposed between adjacent sections of wash media elements 202. The clearance zones 250 may be created by disposing the illumination receptacles 240 between adjacent ones of the groove groupings 224 on the hub exterior surface 220 such that the illumination receptacles will not be obstructed by the wash media elements 202. According to an aspect, the clearance zone 250 can coincide with the location of illumination receptacles 240 such that the illumination elements 204 may be readily visible when the wash media elements 202 are attached to the hub portion 200. As referenced above, the clearance zones 250 may have a clearance zone distance (Dcz) that is greater than the distance (Dme) between adjacent media elements 202 in the same groove grouping 224, as defined above. By this configuration, light from the illumination elements 204 may be seen as the component 10 is being operated as well as when it is at rest. According to an aspect, multiple clearance zones 250 may be uniformly spaced about the periphery of the hub portion 200 to provide a unique aesthetic affect for the component 10.

According to an aspect, the plurality of illumination elements 204 may be connected via its connectors 104 through slip rings to a DC power source so as to emit light from the upper brush assembly 40 during rotation of the device. In other words, lighted illumination elements 204 can rotate with the component 10 as it rotated. It will be appreciated that other types of suitable illumination elements 204 may also be utilized. It will also be appreciated that other suitable ways for attaching the illumination elements to the hub portion may be employed.

According to an aspect, the lighted brush assembly 10 can have an appearance that helps distinguish the wash location from competing sites that use rotary car wash brushes of conventional construction and non-illuminated hubs. In accordance with an aspect, pleasing aesthetic effects can be provided by illuminating the hub portion in one color or one set of colors and employing media elements of other colors such that the appearance of the brushes in, for example, a conveyer wash is attractive and pleasing rather than intimidating and industrial. It will be appreciated that the upper brush assembly 40 and the lower brush assembly 42 may be illuminated different colors at the same time. Also, the colors of the lights can be easily changed. Additionally, the illumination elements 48 can be configured to blink or have other effects to further enhance the aesthetically pleasing effect of the vehicle wash. Different colored illumination elements can be employed at the same time on the same or different components. The LEDs may be easily changed to modify the colors for different purposes. It will be understood that other illumination elements besides LEDs may be employed. Also, the location of the LEDs with the respect to the hub portion 44 may vary as required.

According to an aspect, the clearance zones 120 allow the illumination elements 48 to be seen by vehicle occupants while the component 10 is operating. Additionally, the illumination elements 48 may be visible while the component 10 is at rest. According to another aspect, the illumination elements 48 can rotate with the component 10 so that they can emit light more broadly within the vehicle wash facility. The utilization of the disclosed lighted components can help brighten the environment within a vehicle wash facility to make it more inviting and less intimidating during a wash process. According to a further aspect, the environment can be brightened for vehicle occupants during the wash process by the emission of light that is visible thereto.

According to a further aspect, the utilization of illumination elements 48 in accordance with the present disclosure, which can be seen to vehicle occupants, can assist vehicle wash owners and operators in creating and promoting its brand. As different colored lights may be employed, which can be seen both within and outside the facility, the illumination elements 48 may be more effectively utilized to promote traditional vehicle wash services. The illumination elements 48 may also be employed to promote extra services, which may be offered over and above traditional or basic wash services.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle wash component, comprising:
   a rotatable hub portion having an outer surface and an axis of rotation;
   a plurality of media retention mechanisms disposed in the outer surface of the hub portion, the plurality of media retention mechanisms being spaced around the perimeter of the hub portion;
   a plurality of channels disposed in the outer surface of the hub portion and configured to receive at least one illumination source therein, the plurality of channels being disposed about the perimeter of the hub portion, the plurality of channels being spaced apart a sufficient distance from adjacent ones of the plurality of media retention mechanisms such that each of the plurality of channels is configured to be visible when a wash media element is disposed in each of the plurality of media retention mechanisms;
   at least one illumination source disposed in at least one of the plurality of channels;
   wherein the at least one illumination source is configured to be visible between the wash media elements when the hub is rotating.

2. The vehicle wash component of claim 1, wherein the rotatable hub portion is formed from an extruded metal component.

3. The vehicle wash component of claim 2, wherein the rotatable hub portion consists of a plurality of individual extruded skin portions that are assembled together.

4. The vehicle wash component of claim 1, wherein the at least one illumination source is slideably received in the at least one of the plurality of channels.

5. The vehicle wash component of claim 1 further comprising:
   a plurality of illumination sources each disposed in one of the plurality of channels.

6. The vehicle wash component of claim 5, wherein each illumination source is configured as a strip of LED light sources.

7. The vehicle wash component of claim 6, wherein the hub portion has an upper end and a lower end;
   wherein the illumination sources are configured to extend substantially throughout a length of each of the plurality of channels between the upper end and the lower end of the hub portion.

8. The vehicle wash component of claim 1, wherein the plurality of channels are oriented on the hub portion substantially linearly in a direction parallel to the axis of rotation.

9. The vehicle wash component of claim 1, wherein the plurality of channels are uniformly spaced about the perimeter of the rotatable hub portion.

10. The vehicle wash component of claim 1, wherein the media retention mechanisms are arranged in a plurality of separate and discrete groupings with each of the plurality of groupings including at least a leading wash media retaining mechanism and a trailing wash media retaining mechanism.

11. The vehicle wash component of claim 10, wherein each of the plurality of groupings of the wash media retention mechanisms includes at least one intermediate wash media retaining mechanism disposed between the leading wash media retaining mechanism and the trailing wash media retaining mechanism.

12. The vehicle wash component of claim 11, wherein each of the plurality of groupings of the wash media retention mechanisms includes a plurality of intermediate wash media retaining mechanisms disposed between the leading wash media retaining mechanism and the trailing wash media retaining mechanism.

13. The vehicle wash component of claim 10, wherein the leading wash media retaining mechanism defines a leading radial reference line and the trailing wash media retaining mechanism defines a trailing edge radial reference line.

14. The vehicle wash component of claim 13, wherein each of the plurality of channels is disposed in a clearance zone located between adjacent ones of the plurality of groupings, wherein a clearance zone distance is defined between the trailing radial reference line of a leading wash media retention mechanism grouping and the leading radial reference line of a trailing wash media retention mechanism grouping;
   wherein each of the plurality of channels includes at least one illumination source; and
   wherein the clearance zone distance is greater than a distance between two adjacent wash media retaining mechanisms that are part of the same wash media retention grouping such that light emitted from the at least one illumination source may be visible throughout the entire clearance zone during operation of the device.

15. The vehicle wash component of claim 14, wherein each of the illumination sources extend in one of the clearance zones in a substantially linear direction.

16. The vehicle wash component of claim 14, wherein the hub portion includes an upper portion and a lower portion; and
   wherein each of the illumination sources extends within the clearance zones substantially from the upper portion to the lower portion of the hub portion.

17. A vehicle wash component, comprising:
a rotatable hub portion having an outer surface and an axis of rotation;
a plurality of discrete groupings of wash media retention mechanisms disposed on the outer surface of the hub portion;
each of the plurality of groupings of wash media retention mechanisms including at least a first wash media retention mechanism and a second wash media retention mechanism located rearwardly of the first wash media retention mechanism with respect to a direction of rotation of the hub portion;
each of the wash media retention mechanisms having a center that defines a radial reference line through the axis of rotation;
a plurality of clearance zones disposed on the hub portion defined between adjacent groupings of wash media retaining mechanisms; the plurality of clearance zones having a distance defined between a radial reference line of the last wash media retention mechanism located immediately forward of the clearance zone and a radial reference line of the first wash media retention mechanism located immediately rearward of the clearance zone;
at least one illumination element disposed in each of the plurality of clearance zones;
wherein the clearance zone distance is greater than a distance between radial reference lines of adjacent wash media retention mechanisms such that light emitted from the illumination elements is visible substantially throughout the entire clearance zone during operation of the device.

18. The vehicle wash component of claim 17, wherein the hub portion includes four clearance zones and four illumination elements.

19. The vehicle wash component of claim 17, further comprising:
an illumination element retaining mechanism disposed within each of the plurality of clearance zones.

20. The vehicle wash component of claim 19, wherein each of the illumination element retention mechanisms are configured as an open channel.

21. The vehicle wash component of claim 20, wherein the open channels have a generally arcuate shape.

22. The vehicle wash component of claim 19, wherein the hub portion is constructed of a plurality of extruded metal skin portions that are assembled together to form the hub portion, and wherein each of the plurality of skin portions includes at least one grouping of wash media retention mechanisms and at least one illumination element retaining mechanism.

23. The vehicle wash component of claim 19, wherein each of the illumination elements is slideably disposed in one of the illumination element retaining mechanisms.

24. The vehicle wash component of claim 17, wherein the illumination elements are clipped to the rotatable hub such that they are disposed within the plurality of clearance zones.

25. The vehicle wash component of 17, wherein each of the illumination elements consists of an LED strip.

26. The vehicle wash component of claim 17, wherein each of the plurality of groupings of the media retention mechanisms includes at least one intermediate wash media retaining mechanism disposed between the first wash media retaining mechanism and the second wash media retaining mechanism.

27. The vehicle wash component of claim 26, further comprising:
a plurality of intermediate wash media retaining mechanisms disposed within each of the plurality of groupings between the first wash media retaining mechanism and the second wash media retaining mechanism.

28. A rotary brush for a vehicle wash system, comprising:
a hub portion having an axis of rotation, the hub portion consisting of a plurality of individual extruded metal skin elements;
a plurality of wash media element retaining grooves integrally formed in an outer surface of the hub portion, the plurality of media element retaining grooves arranged in separate and discrete groupings, with each grouping consisting of a plurality of wash media element retaining grooves;
at least one wash media element disposed in the plurality of media element retaining grooves, the plurality of media element retaining grooves configured to retain the plurality of media elements therein while the extruded hub portion rotates about the axis of rotation;
a plurality of clearance zone areas separating adjacent groupings of the plurality of media element retaining grooves;
an illumination element retaining channel formed in the outer surface of the hub portion in each of the clearance zone areas;
at least one light source disposed in the plurality of illumination element retaining channels, the plurality of illumination element retaining channels being configured to retain the light sources while the extruded hub portion rotates about the axis of rotation;
wherein the plurality of illumination element retaining channels are disposed between adjacent groupings of media elements.

29. The rotary brush of claim 28, wherein each of the plurality of groupings includes at least a leading wash media retaining groove and a trailing wash media retaining groove;
the leading wash media retaining groove defines a leading radial reference line and the trailing wash media retaining groove defines a trailing radial reference line;
whereby a wash media separation distance is defined between the radial reference lines of two adjacent wash media retaining grooves in the same grouping.

30. The rotary brush of claim 29, wherein a clearance zone distance is defined between the trailing radial reference line of a leading grouping of wash media element retaining grooves and the leading radial reference line of a trailing grouping of wash media element retaining grooves; and
wherein the clearance zone distance is greater than the wash media separation distance such that light emitted from the illumination elements is visible throughout the entire clearance zone during operation of the device.

31. The rotary brush of claim 28, wherein the at least one light source is an LED strip.

32. The rotary brush of claim 28, wherein the at least one light source is slideably received in each of the plurality of illumination element retaining channels.

33. The rotary brush of claim 28, wherein the rotatable hub portion has an upper end and a lower end;
wherein the at least one light source extends substantially in each of the plurality of illumination element retaining channels between the upper end and the lower end.

34. The rotary brush of claim 33, wherein the at least one light source extends in a substantially linear direction.

* * * * *